Figure 1:
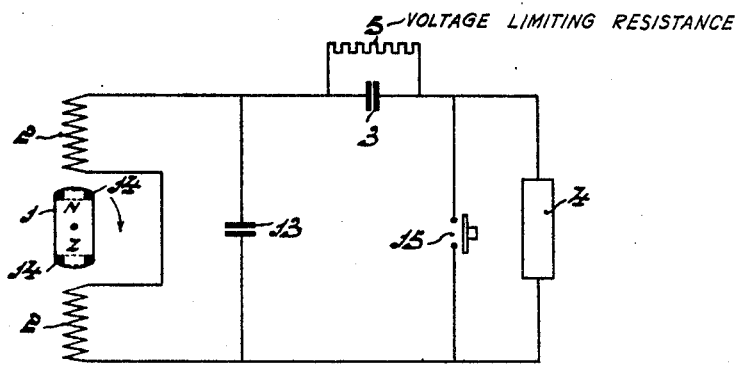

Sept. 2, 1952  M. F. REIJNST ET AL  2,609,528
DEVICE COMPRISING AN ALTERNATING CURRENT
GENERATOR HAVING PERMANENT FIELD MAGNETS
Filed Nov. 22, 1949

INVENTORS
MAXIMILIEN FELIX REIJNST
ROBERT HENRI DE BEER
BY
AGENT

Patented Sept. 2, 1952

2,609,528

UNITED STATES PATENT OFFICE 2,609,528

DEVICE COMPRISING AN ALTERNATING CURRENT GENERATOR HAVING PERMANENT FIELD MAGNETS

Maximilien Felix Reijnst and Robert Henri de Beer, Eindhoven, Netherlands, assignors to Hartford National Bank and Trust Company, Hartford, Conn., as trustee Application November 22, 1949, Serial No. 128,886
In the Netherlands December 17, 1948

6 Claims. (Cl. 322—46)

This invention relates to devices comprising an alternating current generator having permanent field magnets.

In U. S. A. Patent No. 2,486,656, dated November 1, 1949, is described a device comprising an alternating current generator having permanent field magnets, more particularly a generator which has a flat voltage-current characteristic curve and, in operation, is connected in series with a condenser and the load of the generator, the value of the condenser being such that detrimental demagnetisation of the field magnets by the winding of the generator due to high current loads is substantially avoided.

In the said patent it is also stated, that if sparking occurs, for example due to short-circuit of the load, detrimental demagnetisation is still liable to occur. In order to avoid this disadvantage, the said patent proposes to connect an inductance to one of the generator terminals, in series with the generator winding, a further condenser being provided in parallel with this series-connection and in parallel with the series connection of the condenser and the load, the inductance and the further condenser having values such that the generator is protected against serious demagnetisation effects which occur on sparking. The idea underlying said proposal is that certain frequencies generated on the occurrence of short-circuiting primarily cause the demagnetisation, so that the combination of the choke and the further condenser filters out these frequencies. In practice, such a device often proves to be very satisfactory. We have found, however, that in spite of these precautions, demagnetisation of the permanent magnets is still liable to occur under unfavourable conditions.

It has now been found that the detrimental demagnetisation is due to switching phenomena which may occur upon short-circuits and, in fact, the short-circuit current varies in amplitude and in phase dependent inter alia upon:

(a) the instant at which the short-circuit occurs (for example exactly at the top of the alternating current curve);

(b) the momentary charge on the condenser connected in series with the load;

(c) the manner of interruption and nature of the short-circuit contact (periodic arc-formation within a given time);

(d) the momentary electro-motive force of the generator, and (e) the values of inductances, capacities and ohmic resistances included in the generator- and load circuits. The aforesaid different frequencies which are made ineffective as much as possible by means of the known device comprising filters, are determined by the factors stated above at (e), but the amplitude of the current is determined by the factors stated at (a) to (d). The phase of the short-circuiting current relatively to the position of the permanent magnet determines whether the magnet will be demagnetized at a given moment by the field set up by the current, namely when this field is oppositely directed to the field produced in the magnet.

The momentary charge of the condenser connected in series with the load is determined by the value of the charging current which in turn depends upon the nature and the instant of the short-circuit. Thus, it has been found that the charge is a maximum upon the occurrence of a short-circuit producing a high charging current for the condenser, e. g. if the instant at which the short-circuit occurs is substantially at the top of the alternating current curve.

It has now been found that the aforesaid factors (a to d), if they form an unfavourable combination, may often cause a detrimental demagnetisation despite the use of a series-condenser and a filter as proposed in U. S. A. Patent No. 2,486,656, dated November 1, 1949.

The object of the invention is to provide a simpler and more advantageous solution to said problem of demagnetisation.

According to the invention, a device comprising an alternating current generator having a permanent field magnet, more particularly a generator which has a substantially flat voltage-current characteristic curve and, in operation, is connected in series with a condenser and the load of the generator, the value of the condenser being such that detrimental demagnetisation of the field magnet by the winding of the generator due to high current loads is substantially avoided, is characterized in that an over-voltage limiter is provided in parallel with the condenser such that the condenser voltage, even with serious short-circuits, remains below the minimum voltage at which adverse demagnetisation of the permanent magnet occurs. The over-voltage limiter may, for instance, consist of a discharge path or of a resistance. The measure according to the invention permits working at a more suitable point on the demagnetisation curve, with the result that the size of the permanent magnet may be smaller.

The measure according to the invention is based on the recognition that, owing to the leading character of the aforesaid high charging current of the condenser upon a short-circuit, this current itself does not usually exercise an adverse demagnetising influence, but that upon a second short-circuit rapidly following the first (with repeated sparking or arc-formation), the high charge of the condenser due thereto gives rise to a strong discharge impulse across the generator windings, this impulse producing a counteracting demagnetising field which is detrimental to the permanent magnet. This charge may be due to various building up effects in the condenser/generator-winding circuit at a very high voltage. It has been found that if the voltage across the condenser is, for example, 50 volts at normal full load, the voltage may readily rise to, say, 300 volts or even higher with unfavourable short-circuits. This voltage may now be reduced by the over-voltage limiter. This limitation may generally be chosen such that with most short-circuits no detrimental demagnetising influences are exercised upon the permanent magnet. If, however, substantially all factors co-operate to produce a very unfavourable case, the limitation may again be inadequate and a perceptible demagnetisation is possible. According to the theory of chances, however, this possibility is relatively very small, as appears from the extremely large number of test short-circuits required for bringing about one of the very unfavourable short-circuits. Since, moreover, short-circuits are comparatively rare only, the possibility of the occurrence of a very unfavourable short-circuit is again much smaller. For this reason it is fundamentally possible to use exclusively the measure according to the invention, the value of the over-voltage limiter consequently depending on the one hand upon the reduction of the voltage desired with normal short-circuits, and on the other hand upon the loss of energy possible in the over-voltage limiter for economical reasons, so that the value of the limiter should be determined for each separate design of generator.

One advantage of the use of an over-voltage limiter instead of an inductance with a condenser as a filter according to said U. S. A. patent specification is that the losses may be smaller than in the last-mentioned case, since the filter constituted by an inductance and a capacitance should be comparatively large. Voltage losses occur which, inasmuch as IR-losses are concerned and are caused by higher harmonics, cannot be compensated. In addition, the inductance still causes losses.

According to a further feature of the invention the number of possible exceptions which may still occur in spite of the aforesaid expedient, is further reduced by using an over-voltage limiter the resistance of which is dependent with respect to voltage such that its resistance decreases with an increase in voltage across the condenser. By this expedient a certain adaptation of the leakage path to the voltage which may possibly occur is ensured automatically. In accordance with the less detrimental character of one short-circuit it will involve a comparatively low voltage increase which is readily limited by the leakage path chosen therefor, and upon a more serious short-circuit, which would involve a much greater voltage increase, the voltage across the condenser can likewise be limited to a sufficiently low value by the leakage path having a lower resistance with an increase in voltage.

In order that the invention may be more fully understood and readily carried into effect, it will now be described more fully with reference to the accompanying drawing, given by way of example, in which Fig. 1 shows diagrammatically one embodiment of the device according to the invention.

A rotor 1 of an alternating current generator consists of anisotropic permanent magnet steel and has two poles N and Z. The winding of the generator is designated 2. A condenser 3 is connected, in series with a load 4, to the generator terminals and an over-voltage limiter is connected, in the form of a resistance 5, in parallel with the condenser 3.

Figure 2:
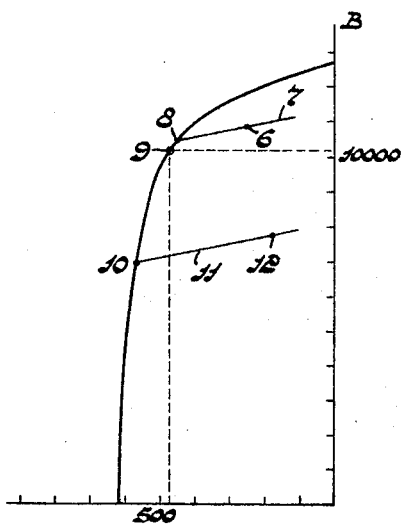

The value of resistance 5 is dependent with respect to voltage and may be such that with most short-circuits the voltage across the condenser is at the most 150 volts, and approximately 50 volts at normal full load. Fig. 2 shows the demagnetisation curve of anisotropic steel having a $(BH)_{max}$ of approximately 4,800,000. The reversible curve on which the working point 6 of the permanent magnet is chosen, is designated 7. With most demagnetisations, with which the voltage across the condenser 3 consequently amounts to 150 volts at the most, the working point will move to the left without, however, reaching the point 8 just above the $(BH)_{max}$ point 9. After the short-circuit, the working point returns to 6 owing to the remagnetisation effect of condenser 3. In these cases the generator is consequently proof against the effects of short-circuits. If however a very serious short-circuit occurs, the voltage across condenser 3 may rise such as to exceed point 8, whereupon the working point falls to, say, point 10 along the very steep demagnetisation curve. After the short-circuit the working point finds its way to, say, 12 on the reversible curve 11 passing through point 10. It is clear that a serious demagnetisation has taken place so that the generator cannot supply the required voltage. As stated, however, this possibility is very small, so that it is very probable that a user of the device will not experience trouble during its life.

To reduce the risk of demagnetisation still further, the diagram shown in Fig. 1 includes a parallel condenser 13, connected across the winding 2 which, as described in U. S. A. Patent No. 2,486,656, dated November 1, 1949, serves as a filter to keep any detrimental frequencies away from the winding 2, the leakage reactance of the winding acting as the self-inductance associated with the filter.

Even then the generator is not perfectly proof against the effects of short-circuits. A further improvement is obtained by providing two short-circuiting turns 14 on the poles of the permanent magnet 1, so that on the occurrence of a demagnetising field an electro-motive force is induced in the windings 14 and a counter-field is produced by which the demagnetising field is partly or entirely compensated.

Owing to the combination of these measures the possibility of detrimental demagnetisation is greatly reduced, whilst a comparatively very favourable working point may be chosen. However, if the generator is intended for sale to persons such as farms or the like in outlying districts, for example for use in combination with a hot-gas engine driving the generator, it is advisable that the generator should be made fully reliable with respect to demagnetisation, since it is not practicable for the generator to be sent to a factory for remagnetisation, in that the time taken would be excessive and the source of electrical energy would not be available to the person for some time.

By the very simple auxiliary measure namely the provision of a short-circuiting switch 15 in parallel with the load 4, the load is momentarily short-circuited after demagnetisation, with the result that the large condenser 3 is connected in parallel with the rotating generator, so that remagnetisation takes place. If even then complete remagnetisation to the working point 6 does not take place, it can be obtained by means of the permanent magnetic rotor or by reversing the sense of rotation of the generator and by again closing the short-circuiting switch momentarily. This combined arrangement including all of the aforesaid features always permits complete remagnetisation, so that a fully reliable device is obtained which has, in fact, been tested with thousands of short-circuits. For a 150 watt generator, the capacity of the condenser 3 was approximately 40 μF, that of condenser 13 being approximately 1½ μF, and the voltage-dependent resistance 6 being 1000 Ω at 50 volts.

What we claim is:

1. A device for protecting an alternating current generator with a substantially flat voltage-current characteristic and having a permanent field magnet against detrimental demagnetisation of the field magnet under relatively high current loads, comprising a capacitor in series with the generator having a value at which currents producing substantial demagnetization of the permanent magnet are limited, a load connected in series with the generator and capacitor, and an over-voltage limiter shunted across the capacitor and operative at a voltage below that at which the voltage developed across the capacitor is less than the minimum voltage at which adverse demagnetization of the permanent magnet occurs thereby preventing adverse demagnetization of the permanent magnet.

2. A device for protecting an alternating-current generator with a substantially flat voltage-current characteristic and having a permanent field magnet against detrimental demagnetisation of the field magnet under relatively high current loads, comprising a capacitor in series with the generator having a value at which currents producing substantial demagnetization of the permanent magnet are limited, a load connected in series with the capacitor and the generator, and an over-voltage limiter having a declining value of resistance with increasing values of voltage across the limiter shunted across the capacitor, said limiter being operative at a voltage below that at which the voltage developed across the capacitor is less than the minimum voltage at which detrimental demagnetization of the permanent magnet occurs thereby preventing adverse demagnetization of the permanent magnet.

3. A device for protecting an alternating-current generator with a substantially flat voltage-current characteristic and having a permanent field magnet against detrimental demagnetisation of the field magnet under relatively high current loads, comprising a capacitor in series with the generator having a value at which currents producing detrimental demagnetization of the permanent magnet are limited, a load connected in series with the generator and capacitor, a filter capacitor in shunt with said generator and said capacitor-load circuit for suppressing detrimentally demagnetising currents, and an over-voltage limiter shunting said first capacitor and operative at a voltage developed across said capacitor below that at which adverse demagnetization of the permanent magnet occurs thereby preventing adverse demagnetization of the permanent magnet.

4. Dynamo-electric apparatus comprising a permanent magnet dynamo-electric generator normally having a substantially flat voltage-current characteristic, the permanent magnet thereof being provided with a short-circuited turn, a load element connected to said generator, a filter capacitor connected across the generator in parallel therewith and the load, a second capacitor in series with the generator and the load and having a value at which currents producing detrimental demagnetization of the permanent magnet are limited, and an over-voltage limiter shunting said second capacitor, said limiter being operative at a voltage developed across the second capacitor which is below that at which adverse demagnetization of the permanent magnet occurs thereby preventing adverse demagnetization of the permanent magnet.

5. Dynamo-electric apparatus comprising a permanent magnet dynamo-electric generator having a normally flat current-voltage characteristic, the permanent magnet thereof being provided with a short-circuited turn, a load element connected to said generator, a first capacitor connected across said generator in parallel therewith and the load, a second capacitor in series with the generator and the load and having a value at which currents producing detrimental demagnetization of the permanent magnet are limited, a short-circuiting switch in parallel with the load, and an over-voltage limiter in parallel with the second capacitor, said limiter being operative at a voltage developed across the second capacitor which is below that at which adverse demagnetization of the permanent magnet occurs thereby preventing adverse demagnetization of the permanent magnet.

6. Dynamo-electric apparatus comprising a permanent magnet dynamo-electric generator having a normally flat current-voltage characteristic, the permanent magnet thereof being provided with a short-circuited turn, a load element connected to said generator, a first capacitor connected across said generator in parallel therewith and the load, a second capacitor in series with the generator and the load and having a value at which currents producing detrimental demagnetization of the permanent magnet are limited, a short-circuiting switch in parallel with the load, means to reverse the direction of rotation of the generator from the normal direction of rotation, and an over-voltage limiter in parallel with the second capacitor, said limiter being operative at a voltage developed across said second capacitor which is below that at which adverse demagnetization of the permanent magnet occurs thereby preventing adverse demagnetization of the permanent magnet.

MAXIMILIEN FELIX REIJNST.
ROBERT HENRI DE BEER.

REFERENCES CITED

The following references are of record in the file of this patent:

UNITED STATES PATENTS

| Number | Name | Date |
|---|---|---|
| 2,383,492 | Klemperer | Aug. 28, 1945 |
| 2,486,656 | Klinkhamer | Nov. 1, 1949 |